(12) United States Patent
Sorenson et al.

(10) Patent No.: US 11,001,682 B2
(45) Date of Patent: May 11, 2021

(54) LIGHTWEIGHT FIRE RESISTANT COMPOSITE UTILITY POLE, CROSS ARM AND BRACE STRUCTURES

(71) Applicant: COMPOSIPOLE INC., Cottonwood Heights, UT (US)

(72) Inventors: Thomas J. Sorenson, Cottonwood Heights, UT (US); B. Jay Larson, Salt Lake City, UT (US)

(73) Assignee: COMPOSIPOLE, INC., Cottonwood Heights, UT (US)

( * ) Notice: Subject to any disclaimer, the term of this patent is extended or adjusted under 35 U.S.C. 154(b) by 0 days.

(21) Appl. No.: 16/671,809

(22) Filed: Nov. 1, 2019

(65) Prior Publication Data

US 2020/0140631 A1 May 7, 2020

Related U.S. Application Data

(60) Provisional application No. 62/754,681, filed on Nov. 2, 2018.

(51) Int. Cl.
*C09K 21/02* (2006.01)
*C09K 21/10* (2006.01)
(Continued)

(52) U.S. Cl.
CPC ............... *C08J 5/044* (2013.01); *C08J 5/042* (2013.01); *C08J 5/043* (2013.01); *C08J 5/046* (2013.01);
(Continued)

(58) Field of Classification Search
CPC ... C08J 5/044; C08J 5/043; C08J 5/046; C08J 2477/02; C08J 2393/00; C08J 5/042;
(Continued)

(56) References Cited

U.S. PATENT DOCUMENTS 3,224,890 A * 12/1965 Skelton .............. C09D 195/005
106/18.11
3,388,932 A   6/1968 Bradley
(Continued)

FOREIGN PATENT DOCUMENTS

CA    2380002    11/2001
EP    2623300    8/2013
(Continued)

OTHER PUBLICATIONS

Paessler, et al., "ring winding technology—increased process efficiency and effects on the mechanical properties of ring specimens" Proceedings of the ASME 2011 Pressure Vessels & Piping Division Conference Jul. 17, 2011.
(Continued)

*Primary Examiner* — Theodore V Adamos
(74) *Attorney, Agent, or Firm* — Parsons Behle & Latimer

(57) ABSTRACT

Disclosed embodiments include hollow composite utility pole, cross arm, and brace structures and methods of manufacture of the same using fire retardant materials. Poles, cross arm, and brace structures may be manufactured using a fire resistant resin impregnated, or resin wetted, filament roving that is wound onto a mandrel, pultruded or otherwise formed into a structural part. Various pole structures and manufacturing methods are described, including chemically bonded sleeve joint structures for poles of varying size.

30 Claims, 11 Drawing Sheets

(51) Int. Cl.

| | |
|---|---|
| *C09K 21/12* | (2006.01) |
| *C09K 21/08* | (2006.01) |
| *C08K 3/26* | (2006.01) |
| *C08K 3/22* | (2006.01) |
| *C08K 5/34* | (2006.01) |
| *C08K 5/52* | (2006.01) |
| *C08K 5/02* | (2006.01) |
| *C08J 5/04* | (2006.01) |
| *C08K 5/3492* | (2006.01) |
| *C08K 5/529* | (2006.01) |
| *E04H 12/02* | (2006.01) |

(52) U.S. Cl.
CPC ............... *C08K 3/22* (2013.01); *C08K 3/26* (2013.01); *C08K 5/02* (2013.01); *C08K 5/34924* (2013.01); *C08K 5/529* (2013.01); *C09K 21/02* (2013.01); *C09K 21/08* (2013.01); *C09K 21/10* (2013.01); *C09K 21/12* (2013.01); *E04H 12/02* (2013.01); *C08J 2477/02* (2013.01); *C08K 2003/2224* (2013.01); *C08K 2003/2227* (2013.01); *C08K 2003/267* (2013.01)

(58) Field of Classification Search
CPC ........ C09K 21/02; C09K 21/10; C09K 21/12; C09K 21/08; C08K 3/26; C08K 3/22; C08K 5/34924; C08K 5/529; C08K 5/02; C08K 2003/2224; C08K 2003/267; E04H 12/02
USPC .......................................................... 52/831
See application file for complete search history.

(56) References Cited

U.S. PATENT DOCUMENTS

| | | | |
|---|---|---|---|
| 4,172,562 A | 10/1979 | Smith | |
| 4,283,446 A | 8/1981 | Mclain | |
| 5,167,742 A | 12/1992 | Peters | |
| 5,175,971 A | 1/1993 | McCombs | |
| 5,744,221 A * | 4/1998 | Crane ................. | E04C 3/29 |
| | | | 242/430 |
| 7,981,500 B2 * | 7/2011 | Yonemoto ............ | C08J 5/24 |
| | | | 428/297.4 |
| 9,745,750 B2 | 8/2017 | Holmes | |
| 2008/0274319 A1 | 11/2008 | Berksoy et al. | |
| 2018/0016807 A1 | 1/2018 | Chronis | |
| 2018/0305866 A1* | 10/2018 | Zhao ................... | B66B 23/24 |
| 2019/0119938 A1* | 4/2019 | Sorenson ............ | E04H 12/02 |

FOREIGN PATENT DOCUMENTS

| | | | | |
|---|---|---|---|---|
| GB | 2286470 | | 8/1995 | |
| JP | 2004314550 | | 11/2004 | |
| KR | 1875077 B1 * | | 7/2018 | ....... C09D 123/0853 |
| WO | WO2001090504 | | 11/2001 | |
| WO | WO2011025520 | | 3/2011 | |
| WO | WO2012043343 | | 4/2012 | |
| WO | WO-2016077849 A1 * | | 5/2016 | ............ E04H 12/04 |

OTHER PUBLICATIONS

US Patent and Trademark Office; Office Action; U.S. Appl. No. 16/168,582; Aug. 7, 2019.

* cited by examiner

LIGHTWEIGHT FIRE RESISTANT COMPOSITE UTILITY POLE, CROSS ARM AND BRACE STRUCTURES

CROSS-REFERENCE TO RELATED APPLICATIONS

This application, under 35 U.S.C. § 119, claims the benefit of U.S. Provisional Patent Application Ser. No. 62/754,681 filed on Nov. 2, 2018, and entitled "Lightweight Fire Resistant Composite Utility Pole, Cross Arm, and Brace Structures," the contents of which are hereby incorporated by reference herein.

FIELD OF THE DISCLOSURE

This disclosure relates generally to composite utility structures and systems and methods for making the same. In particular, systems and methods of manufacture are disclosed for fire resistant composite utility pole, cross arm, and brace structures including, but not limited to, implementing the foregoing and other structures for communications and power transmission and distribution.

BACKGROUND

In this specification where a document, act or item of knowledge is referred to or discussed, this reference or discussion is not an admission that the document, act or item of knowledge, or any combination thereof, was at the priority date, publicly available, known to the public, part of common general knowledge, or otherwise constitutes prior art under the applicable statutory provisions; or is known to be relevant to an attempt to solve any problem with which this specification is concerned.

By some estimates, the frequency of western U.S. wildfires has increased by 400 percent since 1970. Damage is the worst in California, Colorado, Arizona, and New Mexico. These fires have burned six times the land area as before and last five times longer. Their fierce temperatures consume all nutrients and vegetation, leaving little to grow back. A 2016 study found that the number of acres burned since the mid-1980s had doubled.

The fire season itself is also two months longer than it was in the early 1970s. That allows more time for fires to erupt. In California, wildfire season is now year-round. Since 2012, there has not been a month without a wildfire burning.

As of Aug. 20, 2018, wildfires had burned 4.5 million acres. At least 110 wildfires were burning almost 2 million acres. They require 28,250 firemen to combat them. The 2018 Mendocino fire was at that time the largest in California history, burning 500 miles. As of Sep. 6, 2018, damage was $845 million in insurance claims. The Wine Country fires in 2017 cost $10.4 billion in claims.

The 2017 fire season broke numerous regional records for acreage burned and costs incurred. It burnt 9.1 million acres in the United States.

In 2017, the U.S. Forest Service spent almost $2.5 billion, much more than the $1.4 billion spent in 2016. Firefighting consumed 52 percent of its budget. At the peak of the season, more than 280,000 personnel and 1,900 fire engines were deployed. The Air National Guard had to help, dropping 530,000 gallons of fire retardant.

There are a number of instances where wildfires disrupted various utility services. For example, in August of 2015 fires in Oregon and California left thousands without power. In May of 2014, power was cut to several communities in California due to wildfire. Frequently roads are impacted such as in the 2013 Silver Fire in New Mexico. Reports from Burned Area Emergency Response teams frequently include information on road closures and some service interruptions; however, these reports tend to focus on individual fires and do not provide national annual estimates nor do they cover all of the service interruptions.

In November 2018, the Camp Fire became the deadliest and most destructive wildfire in California history. The fire caused at least 85 civilian fatalities, with one person still missing, and injured 12 civilians, and five firefighters. It covered an area of 153,336 acres and destroyed 18,804 structures with most of the damage occurring within the first four hours. Total damage has been estimated at $16.5 to $30 billion. The electrical utility that was responsible for the transmission line suspected of sparking the wildfire, Pacific Gas and Electric (PG&E), filed for bankruptcy after being found liable for the fire.

Typically, the overall service life of current technology wood utility poles is limited to 20-50 years, based on, among other things, the exposure to the outdoor environments where the poles are installed. Of course, wood utility poles are very susceptible to damage from fire as are untreated composite structures. Likewise, as fires become bigger and hotter, even metal utility poles are susceptible to damage from fire.

Other drawbacks, disadvantages, and inconveniences of existing systems and methods also exist.

SUMMARY

Accordingly, disclosed systems and methods address the above-noted, and other, issues of existing systems and methods. For example, the presently disclosed systems and methods provide fire-resistant, stronger, and lightweight alternatives to the wood, cement, and steel poles used today.

In addition, the presently disclosed poles are be manufactured using flame retardant materials, making the utility pole fire resistant. The disclosed materials of the composite utility poles are less likely to ignite under the environments of a short circuit (i.e., sparking), a power line failure, being engulfed in a wildfire, or suffering from any other ignition source. The fire retardant nature of the presently disclosed poles and other structures and components has significant advantages over existing technology and reduces the loss of utility or communications or further property loss.

In addition to being fire resistant, the presently disclosed composite materials are substantially impervious, or at least resistant to the effects of moisture, and are not affected by the weather, and therefore the service life is greater than 50 years for the disclosed composite utility poles.

Additionally, the disclosed composite poles may be directly buried and do not require noxious or otherwise harmful chemical coatings or ground pre-treatment. The disclosed composite poles are also resistant to wildlife, insect, and the like, damage.

In further disclosed embodiments the method includes applying the plurality of fibrous rovings 1-240 at a time, and simultaneously and/or in a circumferential, manner to the longitudinal axis of a forming mandrel during a filament winding process. Other composite manufacturing methods (pultrusion, table wrapping, ring winding, fiber placement, tape placement, and the like) may also be used.

Disclosed embodiments include a utility structure having a fire resistant base structure and a utility support configured to support a utility device. In further disclosed embodiments the fire resistant base structure further comprises a composite material having a primary matrix with a fire resistant additive and a fiber reinforcement.

In some embodiments the fire resistant additive is huntite, hydromagnesite, aluminum hydroxide, magnesium hydroxide, melamine cyanurate, melamine polyphosphate, melamine phosphate, organobromine compounds, or brominated, halogenated, organophosphorous, metal hydroxide flame retardants, or the like.

In some embodiments the fiber reinforcement is basalt, carbon, glass, Kevlar® (i.e., poly-para-phenylene terephthalamide), or the like.

In some embodiments the primary matrix comprises 20%-50% of the weight of the composite material.

In some embodiments the fire resistant base structure is a multi-piece structure.

Also disclosed are methods of making a composite utility structure component. Embodiments of the method include combining a primary matrix material and a fire resistant additive, combining the primary matrix material with a fiber reinforcement, and forming the combined primary matrix material and fiber reinforcement into a utility structure component.

In some embodiments the step of forming the combined primary matrix material and fiber reinforcement into a utility structure component includes filament winding the combined primary matrix material and fiber reinforcement onto a forming mandrel.

In some embodiments the step of forming the combined primary matrix material and fiber reinforcement into a utility structure component includes ring winding the combined primary matrix material and fiber reinforcement onto a forming mandrel.

In some embodiments the step of forming the combined primary matrix material and fiber reinforcement into a utility structure component includes pultruding the combined primary matrix material and fiber reinforcement.

In some embodiments the step of forming the combined primary matrix material and fiber reinforcement into a utility structure component includes table wrapping the combined primary matrix material and fiber reinforcement.

In some embodiments the step of forming the combined primary matrix material and fiber reinforcement into a utility structure component includes fiber placing the combined primary matrix material and fiber reinforcement.

In some embodiments the step of forming the combined primary matrix material and fiber reinforcement into a utility structure component includes tape placing the combined primary matrix material and fiber reinforcement.

In some embodiments the step of forming the combined primary matrix material and fiber reinforcement into a utility structure component includes forming a plurality of segments of a utility pole wherein the plurality of segments are configured to assemble into a utility structure.

In some embodiments the step of forming the combined primary matrix material and fiber reinforcement into a utility structure component includes forming a cross arm or brace for a utility structure.

Other features, advantages, and conveniences of the disclosed systems and methods also exist.

Figure 1:
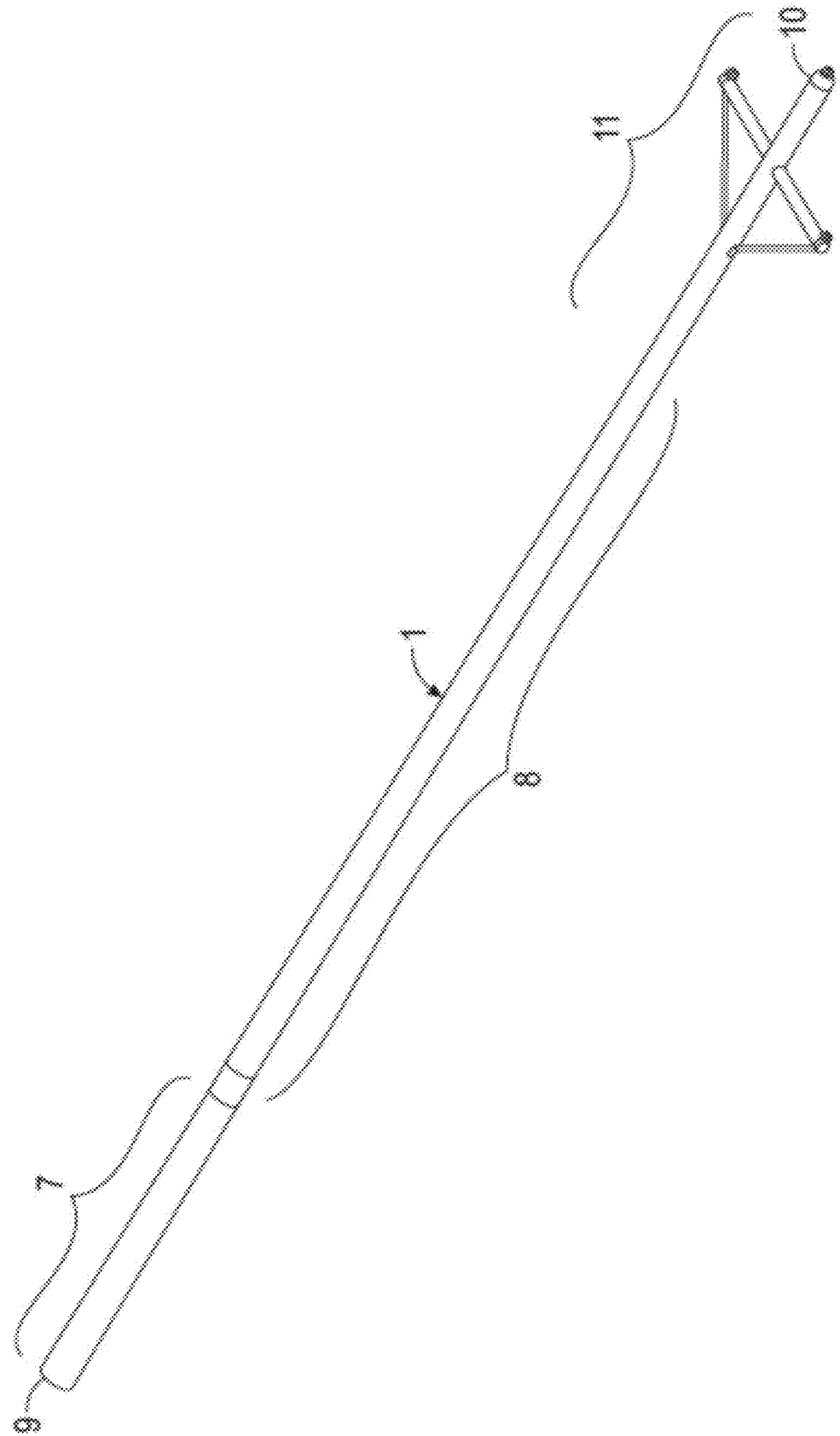
FIG. 1 depicts a one piece composite utility pole, cross arm, and braces, according to embodiments of the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

For a more complete understanding of the present disclosure and its advantages, reference is now made to the following description taken in conjunction with the accompanying drawings, in which like reference numerals represent like parts. The various embodiments disclosed herein are by way of illustration only and should not be construed in any way to limit the scope of the disclosure. Those skilled in the art will understand that the principles of the present disclosure may be implemented in any suitably arranged composite utility pole that is resistant to chemical migration of hazardous materials into the surrounding soil. As disclosed herein, the notational representations of cross sectional geometry presented are not intended to limit the configuration and wall thickness of the composite cylinders in embodiments of the present disclosure.

As used herein, "utility structure" means any pole, truss structure, tower, column, Eiffel structure, tangent poles, guyed structure, self-supporting poles, or the like structure, for carrying utility wires and devices such as electric power lines, telephone lines, fiber optic lines, cable TV and internet transmission lines, cellular transmitters, other wireless transmission and receiving devices (e.g., radio, TV, satellite), traffic lights, signals, and signage, and the like.

As disclosed herein, embodiments of utility structure 1 or other components may be made from fire resistant materials. For example, disclosed embodiments include a hollow composite utility structure 1 comprised of a fiber reinforced matrix having any additive marketed or claiming to have flame retardant properties, including but not limited to, huntite, hydromagnesite, aluminum hydroxide, magnesium hydroxide, melamine cyanurate, melamine polyphosphate, melamine phosphate, organobromine compounds, and/or any other brominated, halogenated, organophosphorous, or metal hydroxide flame retardants, used to inhibit, retard or prevent combustion or otherwise lengthen composite material life while exposed to a flame or heat source.

FIG. 1 is an isometric view of a one piece tapered composite utility structure 1 according to an exemplary embodiment of the present disclosure. Utility structure 1 is constructed of composite, plastic and metallic materials and is vertically erected with the lower portion 7 of the structure directly buried in the ground or fastened to a foundation in the ground. Additionally, embodiments made with fire resistant materials, including but not limited to, huntite, hydromagnesite, aluminum hydroxide, magnesium hydroxide, melamine cyanurate, melamine polyphosphate, melamine phosphate, organobromine compounds, and/or any other brominated, halogenated, organophosphorous, or metal hydroxide flame retardants, used to inhibit, retard or prevent combustion or otherwise lengthen composite material life while exposed to a flame or heat source, resist the damage due to fire.

The design of these embodiments of the structure 1 have a large diameter at the base 9 tapering to a smaller diameter at the top 10. The tapered design allows the cross-section and aerial inertia to vary along the length of the structure 1; optimizing the strength and weight of the utility structure 1 by providing increased strength at the regions of the structure 1 where higher bending loads exist from wind loading, or the like. The composite laminate design includes a plurality of composite plies with varying helical winding angles or a plurality of composite tapes with similar manufacturing methods. In addition to the tapered embodiments shown in FIG. 1, a uniform cross-sectioned tube or pole structure may also be used and may be manufactured using table laying or pultrusion methods.

The composite materials selected for the manufacturing of the presently disclosed utility structures 1 provide many benefits. The disclosed, eco-conscious basalt fiber and pine based resin system, and the disclosed fire resistant materials (e.g., huntite, hydromagnesite, aluminum hydroxide, magnesium hydroxide, melamine cyanurate, melamine polyphosphate, melamine phosphate, organobromine compounds and or any other brominated, halogenated, organophosphorous, or metal hydroxide flame retardants) are not only low cost, but provide, among other things, the following benefits: 1) a composite laminate which is resistant to chemical migration of hazardous materials into the surrounding soil; 2) non-flammable fiber and resin resulting in fire resistance; 3) improved material creep strength and reduced permanent-set from constant loading; 4) improved material dielectric constant increasing the electrical insulation capability of the pole; and 5) significant reduction in weight allowing the utility poles to be installed without heavy lifting equipment.

Figure 2:
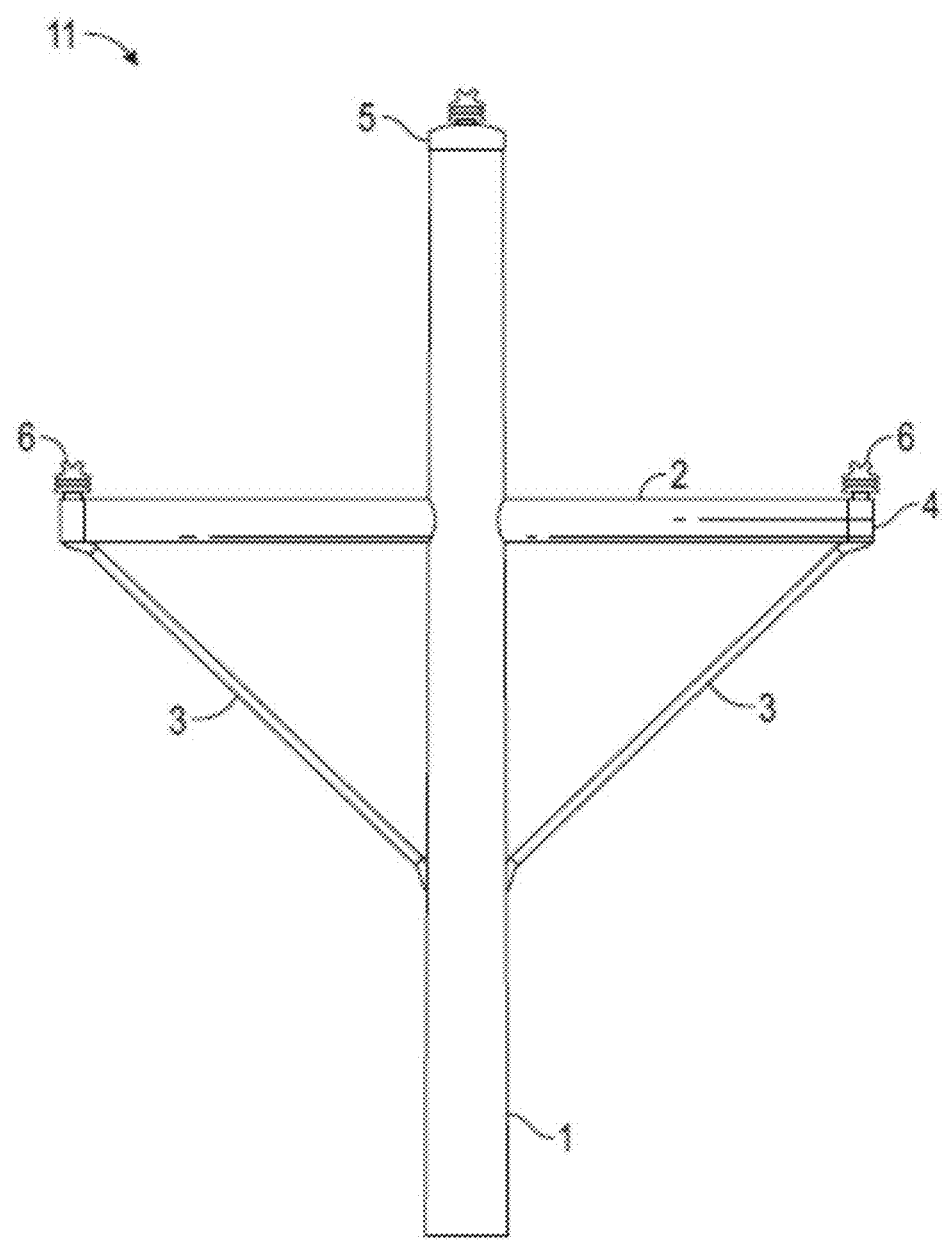
FIG. 2 illustrates an upper portion of a composite utility pole, cross arm, and braces, according to embodiments of the present disclosure.

FIG. 2 shows a detailed view of the upper portion 11 of the utility structure 1. This embodiment includes a composite cross bar 2, which supported by two smaller diameter composite bracing or support rods 3. As with the utility structure 1, the cross bar 2 and support rods 3 may be made from fire resistant materials, including but not limited to, huntite, hydromagnesite, aluminum hydroxide, magnesium hydroxide, melamine cyanurate, melamine polyphosphate, melamine phosphate, organobromine compounds, and/or any other brominated, halogenated, organophosphorous, or metal hydroxide flame retardants, used to inhibit, retard or prevent combustion or otherwise lengthen composite material life while exposed to a flame or heat source, resist the damage due to fire. Likewise, cross bar 2 and support rods 3 may be multi-piece parts, may be more, or fewer, in number than shown in FIG. 2, and may be made by the various methods described herein. On the ends of the cross bars 2 are metallic or plastic end caps 4 bonded to the cross bar 2. On the top of the utility structure 1 is a metallic or plastic top end cap 5. The powerline insulators 6 are fastened to the cross bar end caps 4 and top end caps 5. In some embodiments of the composite utility structure 1, a composite cross bar 2 is not used. Instead, the powerline insulators 6, and other utility equipment (not shown), are fastened directly to the cylinder wall of the structure 1 using threaded inserts (not shown) embedded within the composite laminate.

Figure 3:
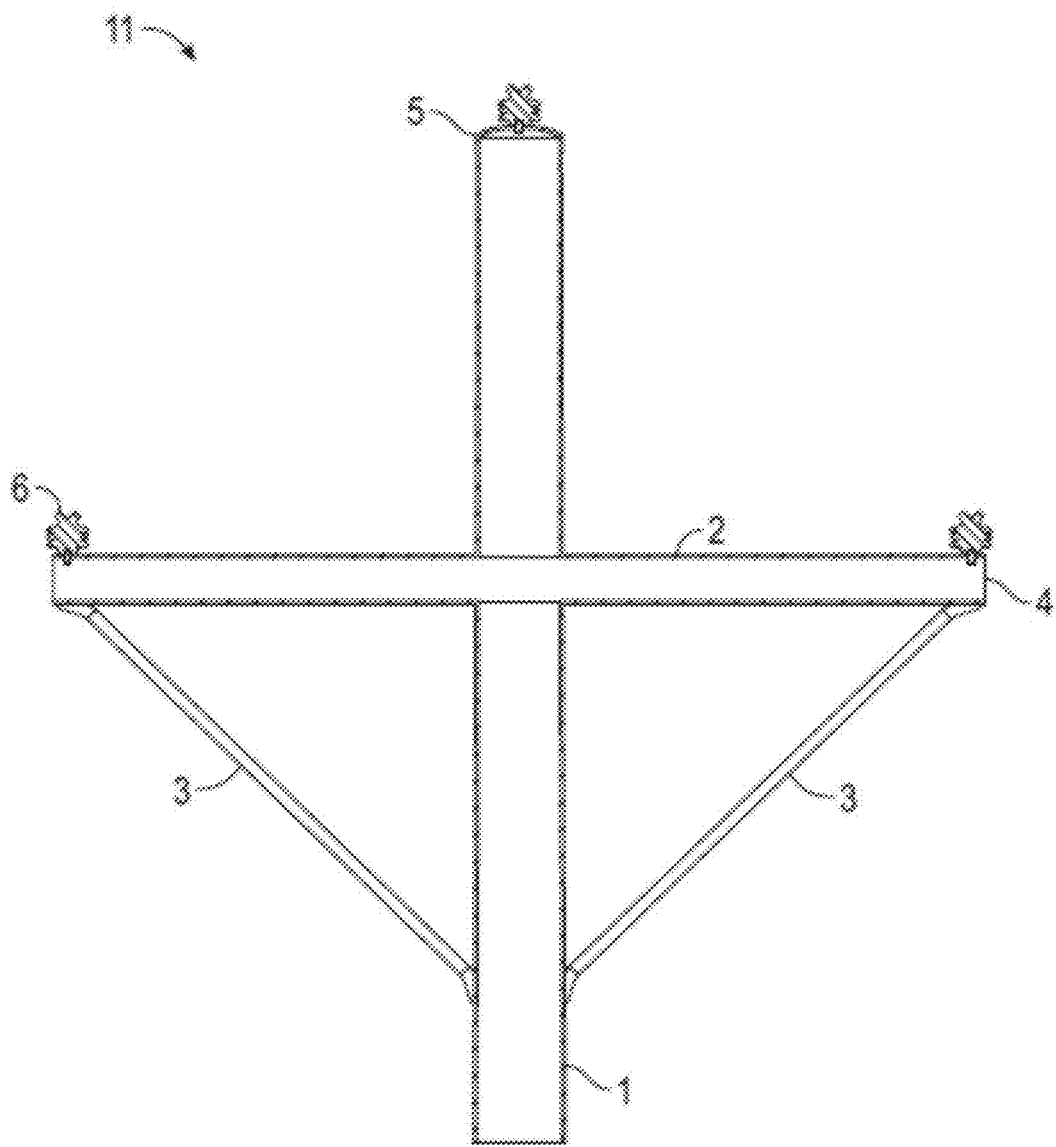
FIG. 3 depicts a sectional view a top portion of a composite utility pole showing cross arm and braces according to embodiments of the present disclosure.

FIG. 3 shows a section view of the upper portion 11 of the utility structure 1. As shown in this section view the composite structure 1 and cross bar 2 have a varying laminate and wall thickness. In these embodiments, the cross bar 2 may be a one piece composite cylinder passing through and centered about the axis of the utility structure 1 and may comprise fire resistant materials, including but not limited to, huntite, hydromagnesite, aluminum hydroxide, magnesium hydroxide, melamine cyanurate, melamine polyphosphate, melamine phosphate, organobromine compounds, and/or any other brominated, halogenated, organophosphorous, or metal hydroxide flame retardants, used to inhibit, retard or prevent combustion or otherwise lengthen composite material life while exposed to a flame or heat source, resist the damage due to fire. The utility structure 1 may be tapered with the larger diameter at the lower portion 7 of the structure 1. The laminate design at the upper portion 11 of the utility structure 1 can be of varying thickness. The thickness of the structure 1 laminate may be based on a strength analysis of the bending load induced on the utility structure 1 due to the worst case wind loading specified in National Electrical Safety Code (NESC) C2-2017 standard. Other safety standards may also be used to determine bending loads and the like.

Figure 4:
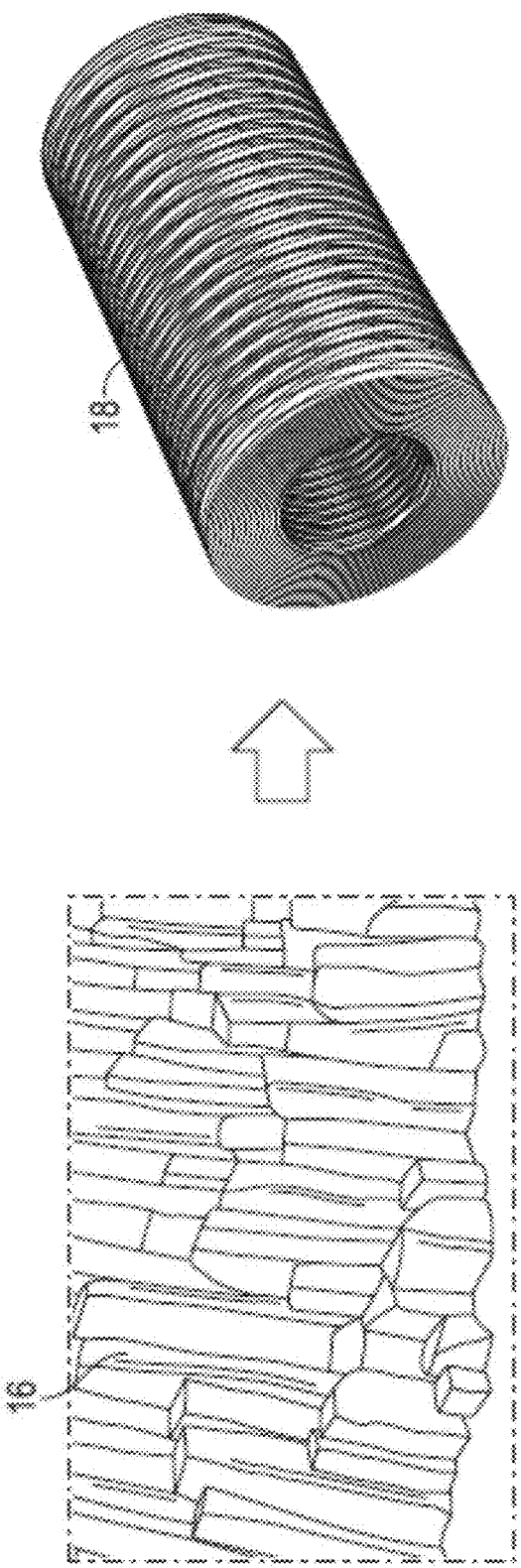
FIG. 4 is a schematic illustration of a natural fiber for use in the composite material in accordance with embodiments of the present disclosure.

FIG. 4 is a schematic illustration of a natural fiber for use in the composite material. In embodiments of the disclosed utility structure 1, a natural occurring resource 16, such as basalt (i.e., igneous rock), may be turned into a fiber 18 for use in the composite material. For example, when heat (~2550° F.) is applied to basalt, which is composed of the minerals plagioclase, pyroxene, and olivine, fibers 18 may be extruded, or otherwise formed. These fibers 18 are inherently UV light resistant, chemically resistant, noncombustible, dielectric, and REACH compliant, among other things. Embodiments may be mixed with a bio-resin, such as a pine-based resin, to comprise the composite material for utility structures 1. Soy-based resins may also be used. Embodiments of utility structures 1 may use a composite material of 20%-40% resin by weight, with 30% being preferred for some embodiments. Embodiments of utility structure 1 using bio-resins reduce the green-house gas emissions by approximately 33% compared to standard epoxy-based resins. Furthermore, fire resistant materials, such as huntite, hydromagnesite, aluminum hydroxide, magnesium hydroxide, melamine cyanurate, melamine polyphosphate, melamine phosphate, organobromine compounds and or any other brominated, halogenated, organophosphorous, or metal hydroxide flame retardants, may be included in the composite materials for utility structure 1 to resist fire damage. Other advantages also exist.

In an exemplary embodiment, a utility structure 1 in accordance with a Class 5, forty foot pole, may be manufactured using the herein disclosed materials and methods to create a forty foot composite pole that weighs 251 pounds, is 136% stronger than an equivalent wood pole, and has 50% less deflection at load than an equivalent wood pole. Other advantages also exist.

Figure 5:
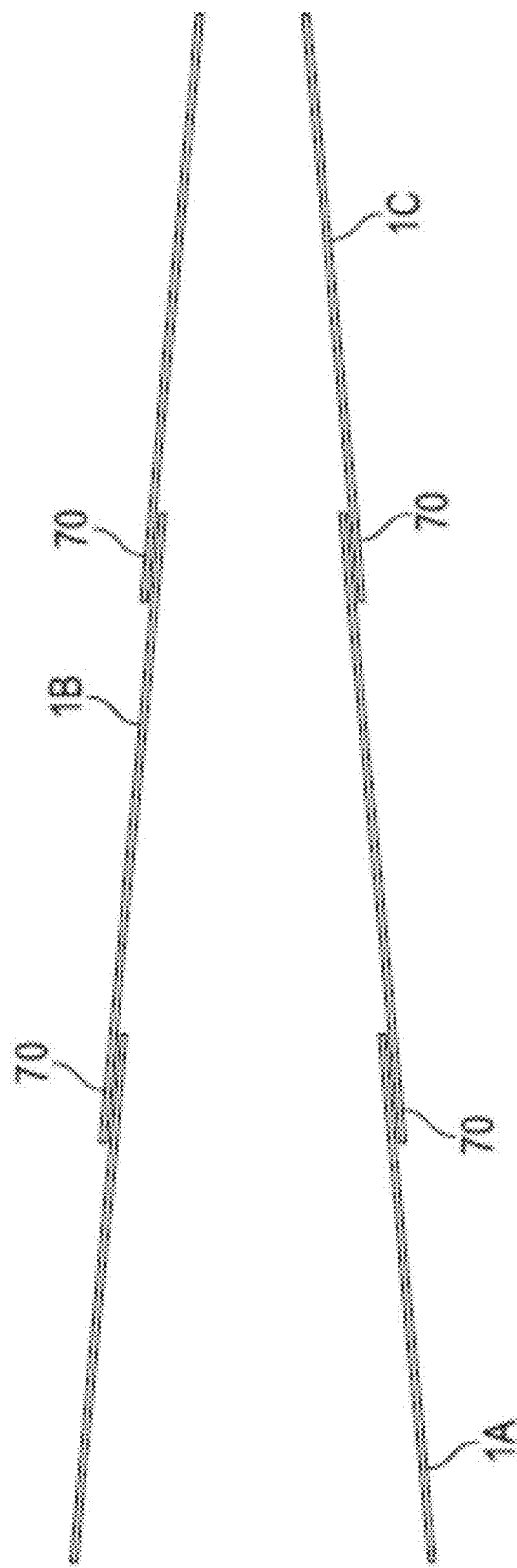
FIG. 5 is a schematic illustration of a plurality of nested, tapered, cylindrical multi-part poles in accordance with embodiments of the present disclosure.

In some embodiments of the composite utility structure 1, a variant design of a plurality of nested, tapered, cylindrical multi-part components 1A, 1B, 1C, etc., as shown in FIG. 5, are utilized. These segmented components 1A, 1B, 1C can be hand carried into limited access locations and erected by a relatively small number people (e.g., 1 or 2) without heavy equipment. As indicated at 70 the segments 1A, 1B, 1C, may be chemically bonded to each other to fasten the segments together to form a larger pole of modular construction. In some embodiments, the segments may also be beveled at the ends as discussed below with reference to FIG. 7. Other advantages also exist.

Figure 6:
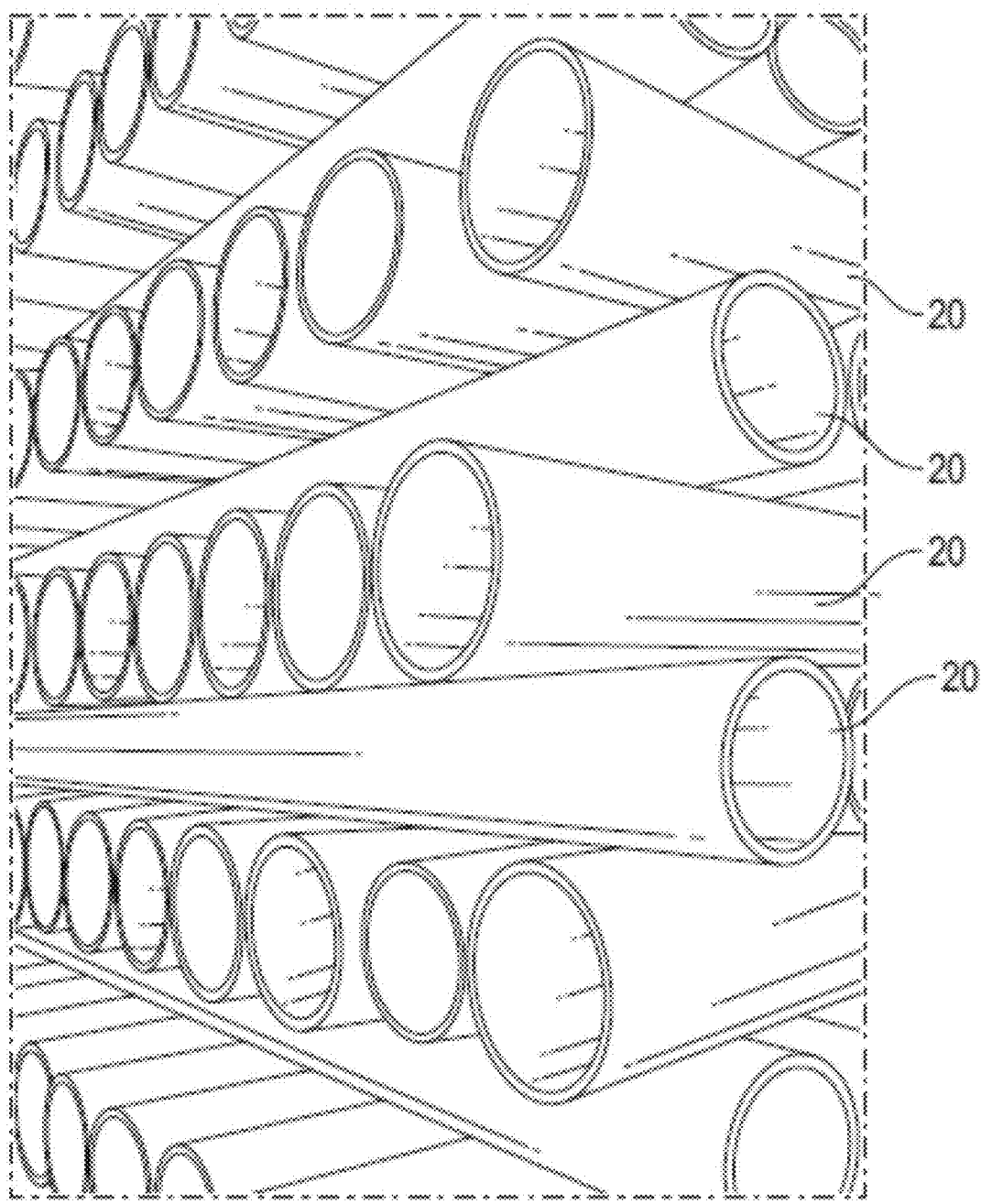
FIG. 6 is an illustration of a number of hollow cylinders manufactured in accordance with presently disclosed embodiments.

FIG. 6 is an illustration of a number of hollow cylinders 20 manufactured in accordance with disclosed embodiments. In addition to functioning as utility structures 1, or components thereof, cylinders 20 may be substantially untapered, or otherwise shaped, to function, for example, as water pipes, marine pilings, lamp poles, high pressure pipes, or the like. Other configurations and uses are possible and will be evident to those of skill in the art having the benefit of this disclosure.

Figure 7:
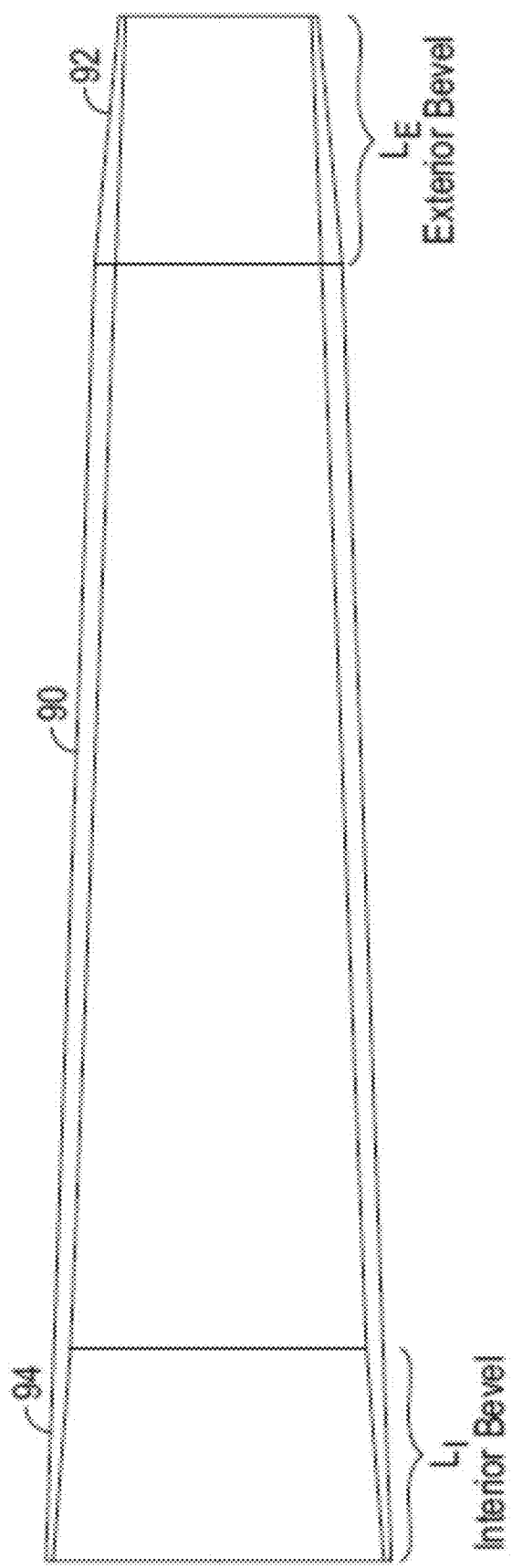
FIG. 7 is a schematic cross-sectional illustration of pole with beveled ends in accordance with disclosed embodiments.

FIG. 7 is a schematic cross-sectional illustration of a utility structure 1 with beveled ends in accordance with disclosed embodiments. As shown pole 90 (which also may be a segment of a utility structure such as 1A-C shown in FIG. 5) may have an exterior bevel 92 at one end. As illustrated, an exterior bevel 92 is one that the outer diameter of the exterior of the pole 90 decreases over a length $L_E$ of the pole. As also illustrated, pole 90 may have an interior bevel 94 on the other end of the pole 90. As illustrated, an interior bevel 94 is one that the inner diameter of the interior of the pole 90 decreases over a length $L_I$ of the pole. As one of ordinary skill having the benefit of this disclosure would understand, poles 90 may be fashioned with interior bevels 94 and exterior bevels 92 on one end of a pole 90, on both ends, one each on opposite ends, and other configurations as desired.

Figure 8:
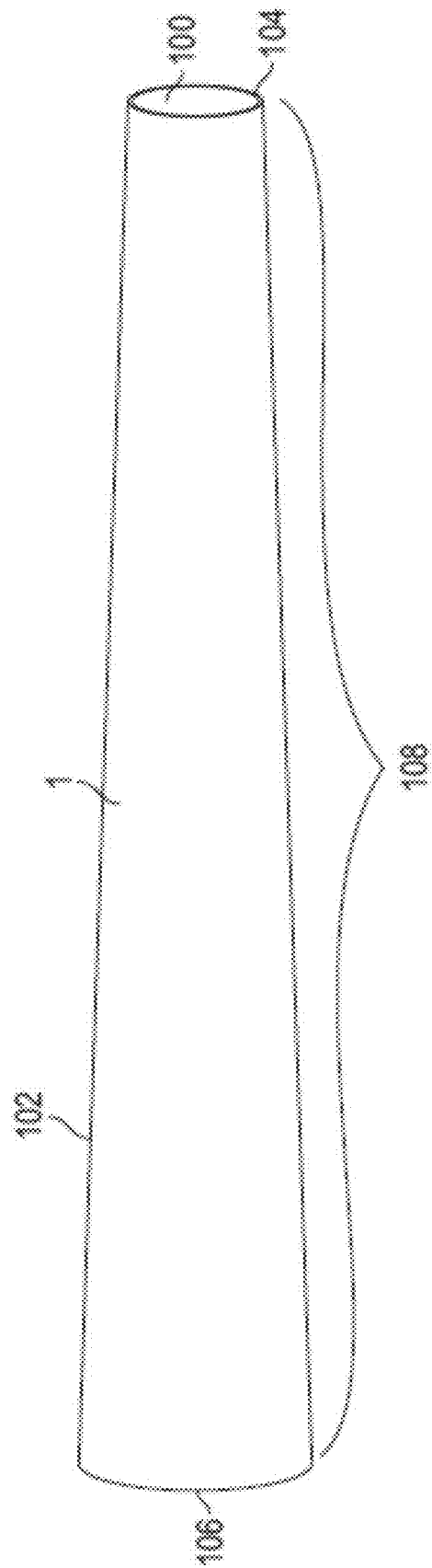
FIG. 8 is a schematic view of a tapered pole 1 in accordance with disclosed embodiments.

FIG. 8 is a schematic view of a tapered utility structure 1 in accordance with disclosed embodiments. As shown, a hollow tapered composite utility structure 1 includes a plurality of fibrous rovings reinforcing a plastic matrix (not shown in FIG. 8) forming a hollow pole having an interior surface 100 and an exterior surface 102 and further having a narrow end 104, a wide end 106, and a taper portion 108 extending between the narrow end 104 and the wide end 106. As one of ordinary skill having the benefit of this disclosure would understand, poles 1 of any length, thickness, taper, width, shape, or the like may be manufactured as desired. As also disclosed herein, utility structure 1 may also comprise a non-tapered (i.e., substantially constant cross-section) pole, or the like.

Figure 9:
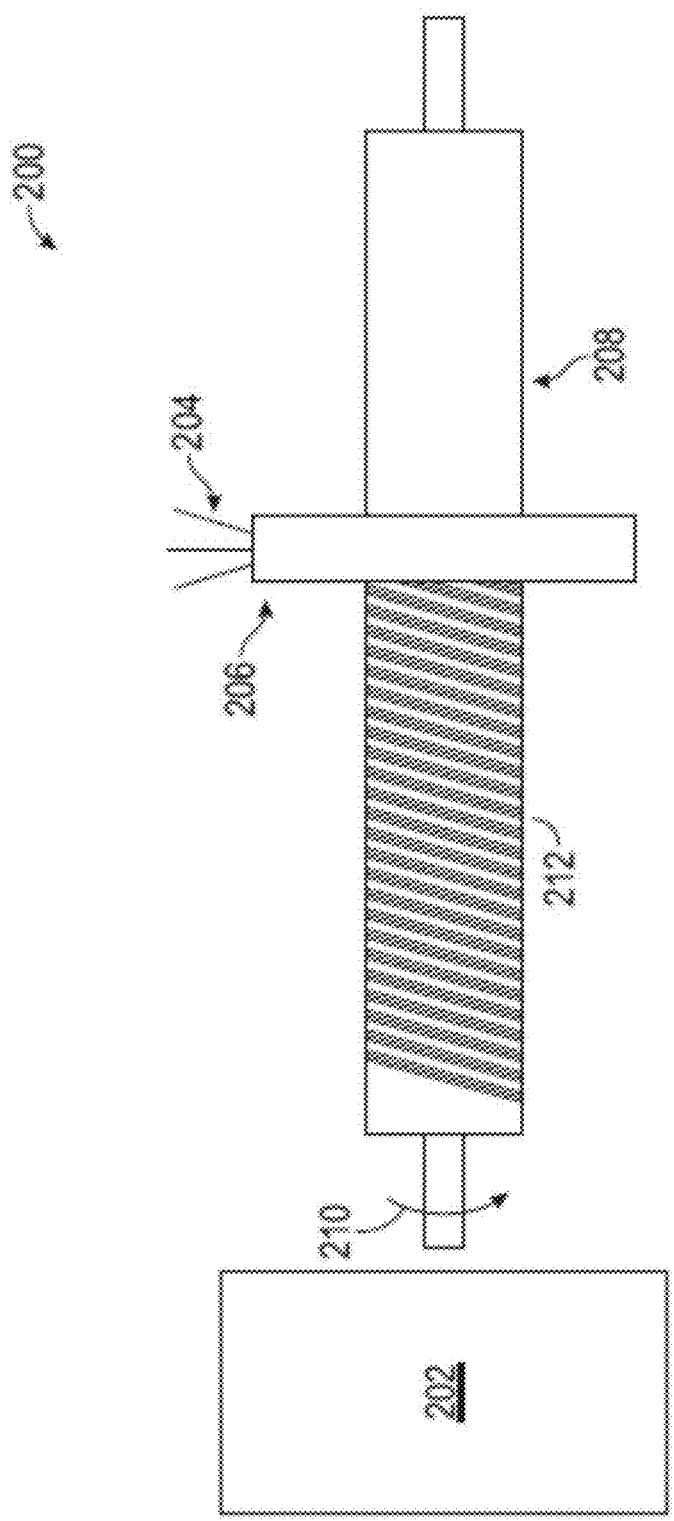
FIG. 9 is a schematic side view of a ring winding system and process in accordance with disclosed embodiments.

FIG. 9 is a schematic side view of a ring winding system 200 and process in accordance with disclosed embodiments. As shown, a ring winding system 200 may include a ring winder 202 having a number of resonated fiber rovings 204 mounted on a number of spools (not shown in FIG. 9). The resonated fiber rovings 204 are delivered to a delivery ring 206 that moves from end-to-end along a mandrel 208. As the mandrel 208 rotates in direction 210 the resonated fiber rovings 204 are laid down in a helical fashion as indicated at 212 at an angle dictated by, among other things, the speed of rotation of the mandrel 208 in the direction of rotation 210 and the speed of travel of the delivery ring 206 along the mandrel 208. Any desired number of rovings 204 may be laid down. For example, in some embodiments as few as 1 roving 204 may be laid down or 240 or more rovings 204 may be laid down.

Figure 10:
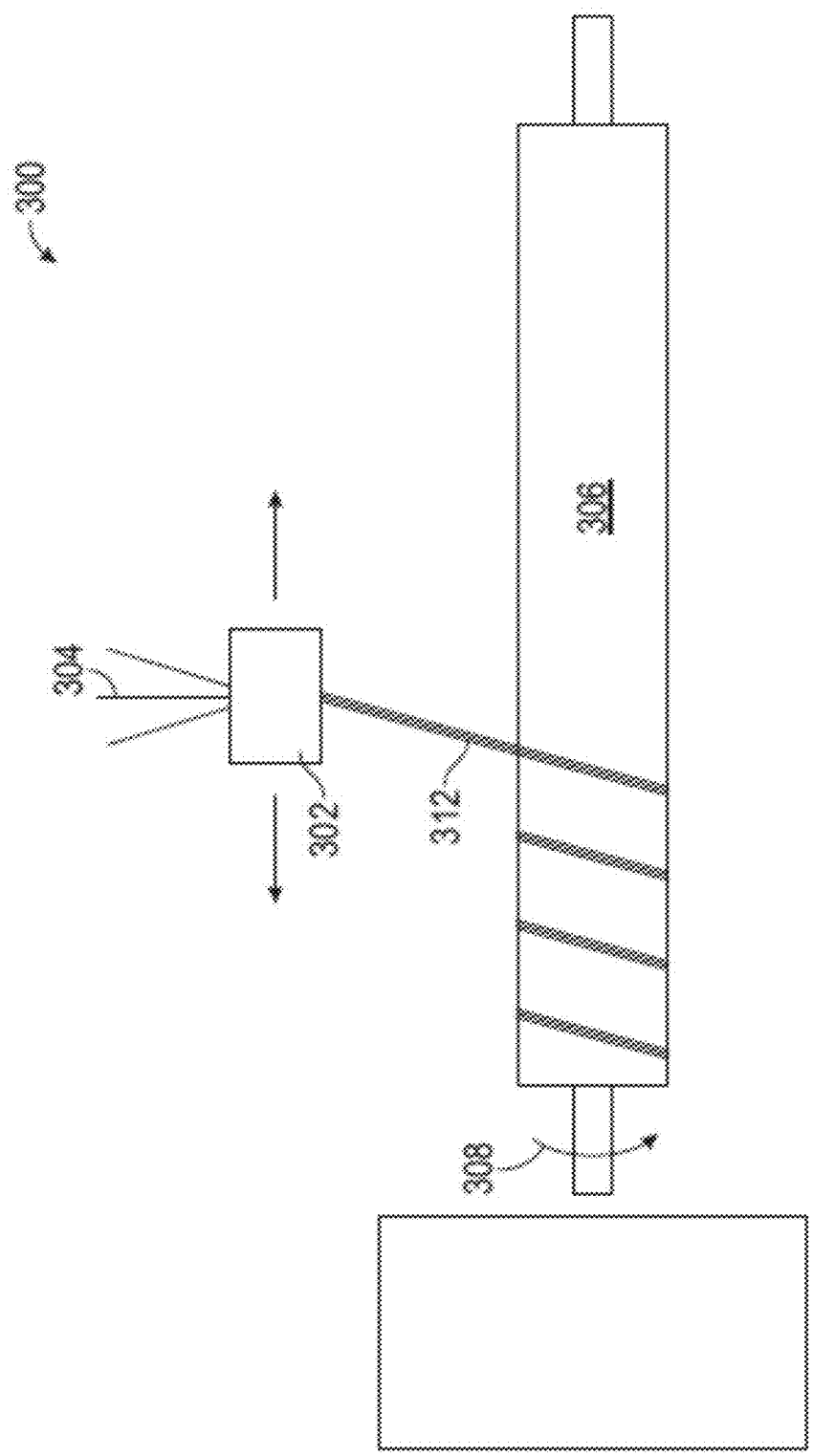
FIG. 10 is a side view schematic of a convention filament winding system in accordance with disclosed embodiments.

While the ring winding system 200 is, among other things, faster, more economical, and more efficient, at manufacturing poles in accordance with this disclosure, it is also possible to manufacture them on conventional filament winding systems 300. FIG. 10 is a side view schematic of a convention filament winding system 300 in accordance with disclosed embodiments. As shown the back-and-forth motion of the delivery head 302 delivers the rovings 304 in a helical fashion as indicated at 312. Delivery head 302 delivers rovings 304 to a mandrel 306 that is rotating. Delivery head 302 moves along the length of the mandrel 306 to lay down the rovings. In this type of system 300 approximately 10-40 rovings 304 may typically be delivered at a time.

Figure 11:
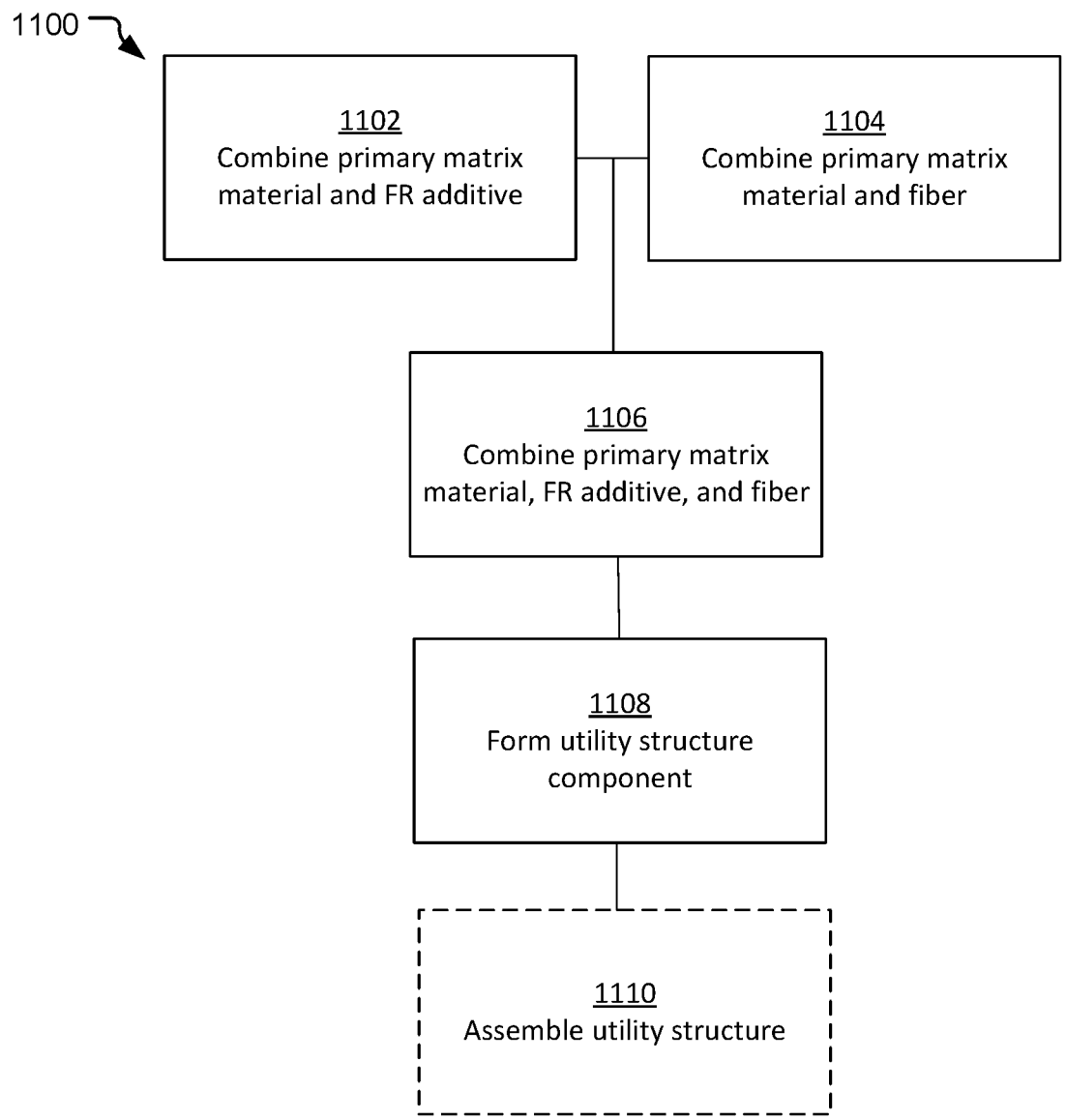
FIG. 11 is a schematic flow chart illustrating methods of manufacture in accordance with disclosed embodiments.

FIG. 11 is a schematic flow chart illustrating methods 1100 of making a composite utility structure component in accordance with disclosed embodiments. As indicated at 1102 the process may begin by combining a primary matrix material, such as epoxy, or the like, and a fire resistant additive such as huntite, hydromagnesite, aluminum hydroxide, magnesium hydroxide, melamine cyanurate, melamine polyphosphate, melamine phosphate, organobromine compounds, or brominated, halogenated, organophosphorous, metal hydroxide, or other flame retardants. As indicated at 1104 the primary matrix material is combined with a fiber reinforcement such as basalt, carbon, glass, Kevlar® (i.e., poly-para-phenylene terephthalamide), or the like. As indicated schematically on FIG. 11 the ordering of steps 1102 and 1104 may be reversed, occur simultaneously, or otherwise be phased. At 1106 the primary matrix material (including the fire resistant additive) and fiber reinforcement are combined. Any suitable ratio of primary matrix material and reinforcing fiber may be used. For example, the matrix material may comprise 20%-50% of the combination and the fiber reinforcement may correspondingly comprise 50%-80% of the combination. Other ratios may also be used.

As indicated at 1108, the manufacturing process may end by forming the combined primary matrix material and fiber reinforcement into a utility structure component. As disclosed herein, the step of forming may be accomplished by any suitable manufacturing technique such as filament winding the combined primary matrix material and fiber reinforcement onto a forming mandrel (e.g., as shown in FIG. 9), ring winding the combined primary matrix material and fiber reinforcement onto a forming mandrel (e.g., as shown in FIG. 10), pultruding (e.g., drawing the combined materials through a heated die) the combined primary matrix material and fiber reinforcement, table wrapping (e.g., laying down successive layers of reinforcing fibers and primary matrix in a mold or the like) the combined primary matrix material and fiber reinforcement, fiber placing the combined primary matrix material and fiber reinforcement, tape placing the combined primary matrix material and fiber reinforcement, or the like.

As indicated at 1110, methods of manufacture may also include forming a plurality of segments of a utility pole and the plurality of segments can then be assembled into a utility structure 1. Additionally, as indicated at 1108, methods of manufacture may also include forming utility structure components such as a cross arm 2 or brace 3 for a utility structure 1.

Although various embodiments have been shown and described, the present disclosure is not so limited and will be understood to include all such modifications and variations would be apparent to one skilled in the art.

What is claimed is:

1. A method of making a composite utility structure component, the method comprising:
    combining a primary matrix material and a fire resistant additive;
    combining the primary matrix material with a fiber reinforcement; and
    forming the combined primary matrix material and fiber reinforcement into a utility structure component by filament winding the combined primary matrix material and fiber reinforcement onto a forming mandrel.

2. The method of claim 1 wherein the fire resistant additive is selected from the group consisting of:
    huntite, hydromagnesite, aluminum hydroxide, magnesium hydroxide, melamine cyanurate, melamine polyphosphate, melamine phosphate, organobromine compounds, or brominated, halogenated, organophosphorous, or metal hydroxide flame retardants.

3. The method of claim 1 wherein the fiber reinforcement is selected from the group of fibers consisting of:
    basalt, carbon, glass, or poly-para-phenylene terephthalamide.

4. The method of claim 1 wherein the step of forming the combined primary matrix material and fiber reinforcement into a utility structure component further comprises:
    forming a plurality of segments of a utility pole wherein the plurality of segments are configured to assemble into a utility structure.

5. The method of claim 1 wherein the step of forming the combined primary matrix material and fiber reinforcement into a utility structure component further comprises:
    forming a cross arm or brace for a utility structure.

6. A method of making a composite utility structure component, the method comprising:
    combining a primary matrix material and a fire resistant additive;
    combining the primary matrix material with a fiber reinforcement; and forming the combined primary matrix material and fiber reinforcement into a utility structure component by ring winding the combined primary matrix material and fiber reinforcement onto a forming mandrel.

7. The method of claim 6 wherein the fire resistant additive is selected from the group consisting of:
    huntite, hydromagnesite, aluminum hydroxide, magnesium hydroxide, melamine cyanurate, melamine polyphosphate, melamine phosphate, organobromine compounds, or brominated, halogenated, organophosphorous, or metal hydroxide flame retardants.

8. The method of claim 6 wherein the fiber reinforcement is selected from the group of fibers consisting of:
    basalt, carbon, glass, or poly-para-phenylene terephthalamide.

9. The method of claim 6 wherein the step of forming the combined primary matrix material and fiber reinforcement into a utility structure component further comprises:
    forming a plurality of segments of a utility pole wherein the plurality of segments are configured to assemble into a utility structure.

10. The method of claim 6 wherein the step of forming the combined primary matrix material and fiber reinforcement into a utility structure component further comprises:
    forming a cross arm or brace for a utility structure.

11. A method of making a composite utility structure component, the method comprising:
    combining a primary matrix material and a fire resistant additive;
    combining the primary matrix material with a fiber reinforcement; and forming the combined primary matrix material and fiber reinforcement into a utility structure component by pultruding the combined primary matrix material and fiber reinforcement.

12. The method of claim 11 wherein the fire resistant additive is selected from the group consisting of:
    huntite, hydromagnesite, aluminum hydroxide, magnesium hydroxide, melamine cyanurate, melamine polyphosphate, melamine phosphate, organobromine compounds, or brominated, halogenated, organophosphorous, or metal hydroxide flame retardants.

13. The method of claim 11 wherein the fiber reinforcement is selected from the group of fibers consisting of:
    basalt, carbon, glass, or poly-para-phenylene terephthalamide.

14. The method of claim 11 wherein the step of forming the combined primary matrix material and fiber reinforcement into a utility structure component further comprises:
    forming a plurality of segments of a utility pole wherein the plurality of segments are configured to assemble into a utility structure.

15. The method of claim 11 wherein the step of forming the combined primary matrix material and fiber reinforcement into a utility structure component further comprises:
    forming a cross arm or brace for a utility structure.

16. A method of making a composite utility structure component, the method comprising:
    combining a primary matrix material and a fire resistant additive;
    combining the primary matrix material with a fiber reinforcement; and forming the combined primary matrix material and fiber reinforcement into a utility structure component by table wrapping the combined primary matrix material and fiber reinforcement.

17. The method of claim 16 wherein the fire resistant additive is selected from the group consisting of:
    huntite, hydromagnesite, aluminum hydroxide, magnesium hydroxide, melamine cyanurate, melamine polyphosphate, melamine phosphate, organobromine compounds, or brominated, halogenated, organophosphorous, or metal hydroxide flame retardants.

18. The method of claim 16 wherein the fiber reinforcement is selected from the group of fibers consisting of:
    basalt, carbon, glass, or poly-para-phenylene terephthalamide.

19. The method of claim 16 wherein the step of forming the combined primary matrix material and fiber reinforcement into a utility structure component further comprises:
    forming a plurality of segments of a utility pole wherein the plurality of segments are configured to assemble into a utility structure.

20. The method of claim 16 wherein the step of forming the combined primary matrix material and fiber reinforcement into a utility structure component further comprises:
    forming a cross arm or brace for a utility structure.

21. A method of making a composite utility structure component, the method comprising:
    combining a primary matrix material and a fire resistant additive;

combining the primary matrix material with a fiber reinforcement; and forming the combined primary matrix material and fiber reinforcement into a utility structure component by fiber placing the combined primary matrix material and fiber reinforcement.

22. The method of claim 21 wherein the fire resistant additive is selected from the group consisting of:
huntite, hydromagnesite, aluminum hydroxide, magnesium hydroxide, melamine cyanurate, melamine polyphosphate, melamine phosphate, organobromine compounds, or brominated, halogenated, organophosphorous, or metal hydroxide flame retardants.

23. The method of claim 21 wherein the fiber reinforcement is selected from the group of fibers consisting of:
basalt, carbon, glass, or poly-para-phenylene terephthalamide.

24. The method of claim 21 wherein the step of forming the combined primary matrix material and fiber reinforcement into a utility structure component further comprises:
forming a plurality of segments of a utility pole wherein the plurality of segments are configured to assemble into a utility structure.

25. The method of claim 21 wherein the step of forming the combined primary matrix material and fiber reinforcement into a utility structure component further comprises:
forming a cross arm or brace for a utility structure.

26. A method of making a composite utility structure component, the method comprising:
combining a primary matrix material and a fire resistant additive;
combining the primary matrix material with a fiber reinforcement; and forming the combined primary matrix material and fiber reinforcement into a utility structure component by tape placing the combined primary matrix material and fiber reinforcement.

27. The method of claim 26 wherein the fire resistant additive is selected from the group consisting of:
huntite, hydromagnesite, aluminum hydroxide, magnesium hydroxide, melamine cyanurate, melamine polyphosphate, melamine phosphate, organobromine compounds, or brominated, halogenated, organophosphorous, or metal hydroxide flame retardants.

28. The method of claim 26 wherein the fiber reinforcement is selected from the group of fibers consisting of:
basalt, carbon, glass, or poly-para-phenylene terephthalamide.

29. The method of claim 26 wherein the step of forming the combined primary matrix material and fiber reinforcement into a utility structure component further comprises:
forming a plurality of segments of a utility pole wherein the plurality of segments are configured to assemble into a utility structure.

30. The method of claim 26 wherein the step of forming the combined primary matrix material and fiber reinforcement into a utility structure component further comprises:
forming a cross arm or brace for a utility structure.

* * * * *